Patented Aug. 31, 1937

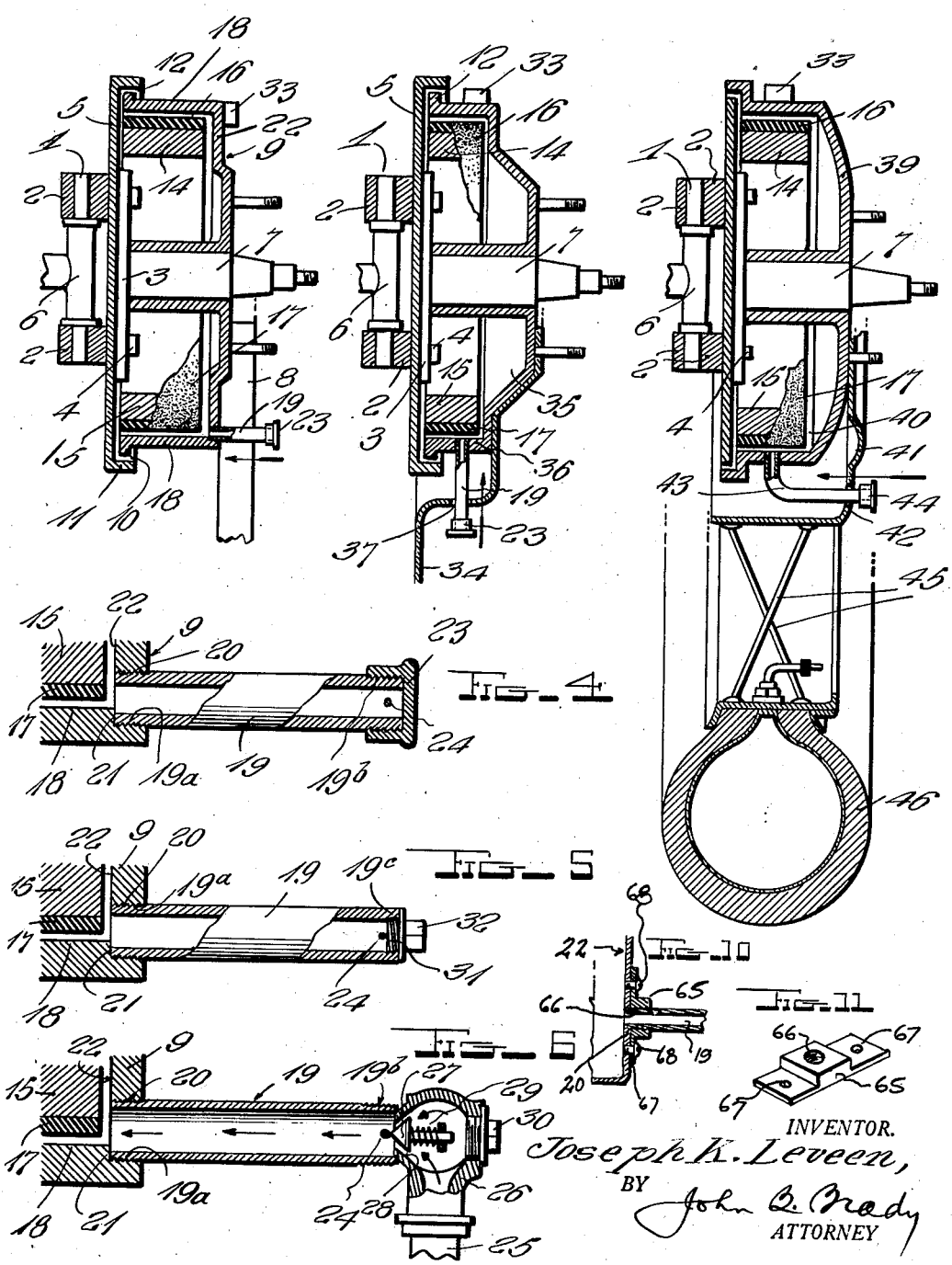
Aug. 31, 1937.  J. K. LEVEEN  2,091,865
BRAKE SYSTEM
Filed Dec. 7, 1935    2 Sheets-Sheet 1
INVENTOR.
Joseph K. Leveen,
BY John B. Brady
ATTORNEY

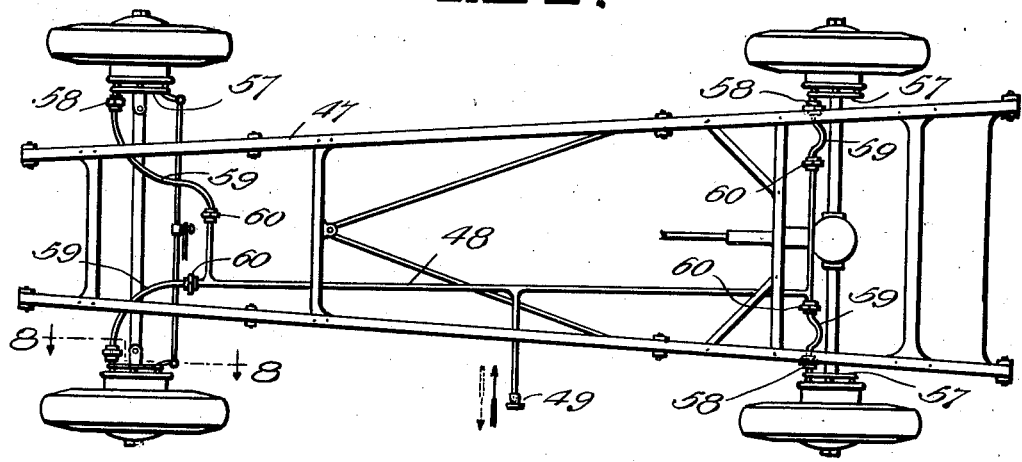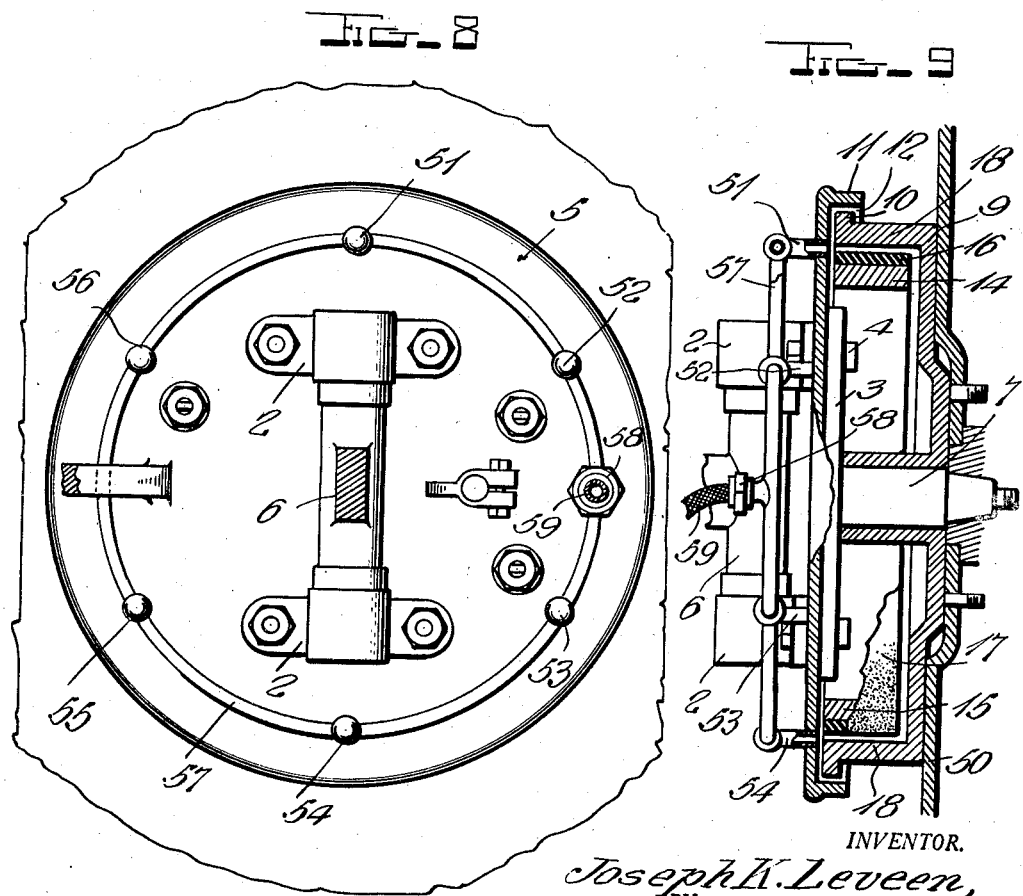

2,091,865

UNITED STATES PATENT OFFICE 2,091,865

BRAKE SYSTEM

Joseph K. Leveen, Boulder, Colo.

Application December 7, 1935, Serial No. 53,408

14 Claims. (Cl. 188—2)

My invention relates broadly to brake systems and more particularly to a system for maintaining the brake bands in good condition over a relatively long period of use.

One of the objects of my invention is to provide means for maintaining the brake bands of a vehicle free and clear of accumulations of dirt and other foreign matter which may detrimentally affect the operation of the brake system of a vehicle.

Another object of my invention is to provide means for improving the operation of the brake system of a vehicle for dislodging dirt, foreign matter, and metallic particles which may become embedded in a brake lining, causing rapid wear of the brake drum and causing the brake to grab.

Still another object of my invention is to provide an arrangement by which steam or air under pressure may be directed against the surface of a brake band for treating or rejuvenating the surface of the brake band and removing therefrom all dust or dirt particles which may tend to detrimentally affect the interior surface of the brake drum in the brake system of a vehicle.

A further object of my invention is to provide a brake band cleaning and treating system which may be permanently installed with respect to the chassis of a vehicle for facilitating the maintenance of the brake bands in the brake system of a vehicle.

A still further object of my invention is to provide an arrangement of conditioning system for the brake bands of a vehicle in which either vacuum or pressure treatment may be employed in the conditioning of the brake bands.

Still another object of my invention is to provide a construction of conditioning system for the brake bands of a brake system which may be reversibly employed with either vacuum or pressure for cleaning, rejuvenating, or conditioning the brake bands of a vehicle or cooling such brake bands under conditions of excessive heating due to friction.

Other and further objects of my invention will be more fully understood from the specification hereinafter following by reference to the accompanying drawings, in which:

Figure 1 is a cross-sectional view through a brake drum and housing embodying my invention with certain of the parts illustrated in side elevation and showing my invention applied to a wooden spoke wheel; Fig. 2 shows the application of my invention to a modified form of brake drum and housing, the view being taken in vertical section through the brake drum and housing applied to a disc wheel; Fig. 3 illustrates in vertical section a further modified form of brake drum and housing and showing the application of my invention to a wire spoke wheel; Fig. 4 is a sectional view through a pressure or vacuum applying connection for the brake housing; Fig. 5 is a view of a modified form of connection similar to the connection illustrated in Fig. 4; Fig. 6 shows the method of applying air pressure to the connection illustrated in Fig. 4; Fig. 7 is a view of a vehicle chassis showing a modified form of my invention applied thereto; Fig. 8 is an elevational view looking toward the brake housing on line 8—8 of Fig. 7; Fig. 9 is a vertical sectional view through the brake drum illustrated in Fig. 8 with parts illustrated in side elevation; Fig. 10 is a cross sectional view illustrating a modified method of attachment of a stem device to a brake drum; and Fig. 11 is a perspective view of the stem attachment device employed in the modified form of Fig. 10.

My invention is directed to means for reducing maintenance costs in vehicle brakes and improving the operation of the brakes by removing dust and dirt and particles of metal from the brake linings or in the drums which normally tends to cause a brake to grab and screech and results in the rapid wear or cutting of the brake drum with the ultimate impairment in brake operation. I provide a construction of brake drum housing and brake drum by which air or steam under pressure may be injected substantially throughout the gap between the brake drum and brake lining for removing foreign matter and treating the surface of the brake lining. In lieu of air or steam pressure treatment, I may evacuate the brake drum housing for removing dirt, foreign matter, and metallic particles through the same means I provide for injecting air or steam under pressure into the brake drum housing. I arrange a stem device which protrudes between the spokes of the wheel and connects with the brake drum housing so that air or steam may be injected between the brake lining and the brake drum. The stem device may be shaped in the case of metallic wheels to provide attachment means for an air pressure or steam pressure or a vacuum system which will blow air or steam directly on the surface of the lining within the brake drum housing. Where the wheel is solid or is the disc type construction, a straight stem device protruding from the flat surface of the drum for directing the air or steam normal to the brake lining or establishing a vacuum directly adjacent the surface of the brake lining is provided. The wheel may be revolved with the air or steam or vacuum system connected with the stem device to insure the application of air or steam pressure or the application of vacuum throughout the entire surface of the brake lining. The arrangement of the system of my invention as heretofore explained contemplates the jacking of the vehicle wheel from the traction surface so that the vehicle wheel may be manually revolved as the brake lining is subjected to treatment.

In lieu of the manual application of air or steam pressure or vacuum to each brake drum housing, I may provide a centralizing system for conditioning the brake linings wherein air pressure, steam, or vacuum applying devices project from the backing plate of the brake drum housing in a plurality of positions about the backing plate and interconnected to supply air or steam pressure or to apply vacuum between the surface of the brake drum and the surface of the brake lining. A flexible connection is made between the interconnection means and a pressure or vacuum distribution system on the vehicle chassis to which connection may be conveniently made so that, simultaneously, all of the brake linings may be subjected to air or steam treatment or a vacuum applied to the brake drum housings. The permanently installed system also affords means for cooling the brake bands and the brake drum under conditions of excessive friction and heating. Such heating is undesirable not only because of the deleterious effect upon the brake linings but also because of the normal conduction of heat through the metallic wheels to the vehicle tires where excessive heating impairs the efficiency of operation of the tires. In such a case, cool air is forced through the interconnected system and directed on the brake drums and the brake bands.

Referring to the drawings in more detail, reference character 1 designates the king pin which is journaled in the members 2 which are secured to the spindle plate 3 by means of bolt members 4 which extend through the backing plate 5 of the brake drum housing. The king pin 1 extends through the frame member 6 by means of which the chassis is suspended through springs with respect to the vehicle wheels. The spindle plate 3 carries the spindle 7, the end of which is suitably shaped to receive the vehicle wheel which I have indicated in Figure 1 as having spokes 8. The brake drum housing 9 is rigidly secured with respect to the structure of the vehicle wheel and is provided with a peripheral flange 10 which coacts with the flange 11 on the backing plate 5, rendering the brake drum housing practically dust- and air-tight, except for the necessary intervening gap 12 which must be provided between the rotating flange 10 and the fixed flange 11. The backing plate 5 provides means for mounting the brake shoes which I have indicated generally at 14 and 15. The brake shoes are shown as carrying brake linings 16 and 17. As illustrated in Fig. 1, there is normally a gap between the surface of the brake linings 16 and 17 and the interior surface of the brake drum 18 which is formed integrally with the brake drum housing indicated at 9. The stem device is shown at 19 screw-threaded at each end thereof as shown more clearly in Figs. 4, 5 and 6. The stem device 19 has a screw-threaded end 19a thereof engaged in a screw-threaded aperture 20 in the brake drum housing 9. It will be observed that the stem device 19 is axially aligned with the gap between the brake linings 16 and 17 and the interior surface of the brake drum indicated at 18. As indicated in Figs. 4, 5 and 6, the aperture 20 is so located in the wall of the brake drum housing 9 that an abutting shoulder 21 is provided in alignment with the plane of the interior surface of the brake drum housing indicated at 22. Accordingly, the stem device 19 cannot protrude into the brake drum housing and form an obstruction with respect to the operation of the brake shoes. The fact that the stem device 19 is not aligned with the interior surface of the brake drum 18 insures the delivery of maximum air or steam pressure or the establishment of a vacuum directly in the gap between the surface of the brake linings 16 and 17 and the interior surface of the brake drum 18.

The stem device 19 has the opposite screw-threaded end 19b thereof closed by a cap 23 as illustrated in Fig. 4. There is a laterally extending pin member 24 disposed in the end of stem device 19 to serve as an actuating member for a valve applicator in delivering air or steam pressure through the stem device 19 in the gap between the brake linings 16 and 17 and the interior surface of the brake drum 18 as I have schematically illustrated in Fig. 6. The valve applicator as shown in Fig. 6 comprises delivery hose 25 connected with nozzle head 26 which contains the spring-pressed valve 27. The spring-pressed valve 27 is shaped to normally engage the correspondingly shaped walls 28 of the nozzle head 26 for closing the nozzle head. However, when the nozzle head is brought into registry with the end of the stem 19, the valve 27 is engaged by the diametrically extending pin 24 and depressed against the action of spring 29 allowing air or steam pressure to be delivered through stem 19 and in the gap between the brake linings 16 and 17 and the interior surface of brake drum 18. A removable plug 30 is provided in the nozzle head 26 for readily repairing parts of the nozzle head or removing any obstruction which may become lodged in the path of the valve.

In lieu of the cap device 23, I may provide a plug 31 as illustrated in Fig. 5 which is screw-threaded to engage internal screw threads 19c formed on stem 19. The plug device 31 has the end 32 thereof shaped to be readily engageable by a tool for closing the end of the stem device for preventing the ingress of dust or dirt into the brake drum housing when the stem device is not connected with the air, steam, or vacuum system. To effect a cleaning of the brake linings, I apply the applicator to the end of the stem device 19 and slowly revolve the vehicle wheel while the vehicle wheel is jacked away from the traction surface for thereby reaching all parts of the surface of the brake lining and insuring a thorough cleaning thereof. In the pressure system, dirt, foreign matter, and metal particles are dislodged from the brake linings and blown out from the brake drum housing through the gaps through which such matter tends to enter the housing such as through gap 12 between flanges 10 and 11.

In order to provide for the accurate counterbalancing of the brake drum housing 9 due to the addition of the weight of the stem device 19, I add to the brake drum housing in a position which does not interfere with the vehicle wheel a mass which I have indicated generally at 33 diametrically opposite the stem device 19. By virtue of the counterbalancing thus provided, the vehicle wheel may be rotated with the same degree of precision for which the wheel was originally balanced.

In Fig. 2, I have illustrated my invention as applied to a metallic wheel of the disc type wherein the disc of the wheel is shown at 34 connected with the brake drum housing 35. While the brake shoes and brake linings for a wheel of this type are somewhat different in shape, I have identified the several parts by reference characters similar to the reference characters applied to corresponding parts in Fig. 1. In the construction illustrated in Fig. 2, the stem device 19 is screw-threaded directly into the surface of the brake drum indicated at 36. The stem device 19 passes through an aperture 37 in the disc type wheel 34 and is closed by means of a cap 23, as shown. In this arrangement, the air or steam pressure is directed directly to the surface of the brake lining 15 or 16 or a vacuum is established directly adjacent the surface of the lining.

In Fig. 3, I have shown my invention applied to a vehicle wheel of steel and wire construction wherein the brake drum housing is shaped as indicated at 39. In this arrangement, the brake shoes and brake shoe linings are different from the constructions heretofore illustrated, but for purposes of explaining my invention, I have indicated corresponding parts by means of similar reference characters. The brake drum housing is indicated as having a brake drum 40. The steel and wire wheel is secured to the brake drum housing through frame structure 41 as illustrated. The frame structure is apertured at 42 for the passage of the curved stem device 43. The inner end of the curved stem device 43 is screw-threaded directly into the brake drum housing 39 terminating in the interior surface of the brake drum 40. The stem device 43 has the end closed by a suitable cap 44. The steel wheel is represented generally as having spokes 45 and pneumatic tire structure 46. Air or steam pressure is directed against the surface of the brake linings 16 and 17 or a vacuum is established directly adjacent the surface of the brake linings 16 and 17 in the construction of wheel illustrated in Fig. 3.

Figs. 7, 8 and 9 illustrate a modified form of my invention in which the chassis of a vehicle is designated by reference character 47 and has mounted thereon a pipe system indicated generally at 48. The pipe system 48 has a terminus 49 through which air or steam may be introduced, or through which a vacuum may be established in the same manner as that shown in Fig. 6 in connection with the short direct conduit 19, the terminus 49 having a similar valve release pin 24 mounted therein. The pipe system 48 distributes from a central position of the chassis to a position adjacent the brake drum housings at each of the vehicle wheels. The brake drum housings are shown more particularly in Figs. 8 and 9, as including a backing plate 5 arranged in a manner similar to the arrangement shown in Fig. 1 insofar as the mounting of the brake drum with respect to the vehicle chassis is concerned. The arrangement of brake shoes 14 and 15 and the brake linings 16 and 17 for coacting with the interior surface 18 of the brake drum housing 9 is similar to the arrangement discussed in connection with the structures of Figs. 1, 2 and 3. A metal wheel 50 is shown connected with the spindle 7 and brake drum housing 9.

The backing plate 5 in the form of my invention shown in Figs. 7, 8 and 9 is provided with a plurality of stem devices which I have shown generally at 51, 52, 53, 54, 55 and 56, which are arranged in a circular path directly aligned with the gap between the internal cylindrical surface of the brake drum at 18 and the exterior surfaces of the brake linings 16 and 17. That is to say, the stem devices are so located in the backing plate 5 that the axes thereof extend through the gap disposed between the brake drum linings 15 and 16 and the interior cylindrical surface of the brake drum 18 when the brake shoes 14 and 15 are in released position. The stem devices 51—56 are all interconnected by a circular pipe member indicated at 57 having an intake 58.

The intake 58 is connected to a flexible hose 59 with connections 60 on the pipe distribution system 48. The flexible hose connections take up all movement of the vehicle chassis with respect to the brake drum housings and no strains are thereby involved in the pipe system or in the brake drum housing.

An air supply connected to the terminus 49 immediately establishes a pressure at a plurality of positions around the brake linings 16 and 17, clearing the brake linings of dirt, foreign matter or metallic particles, allowing such foreign matter to be drawn out between the slight gap between the brake drum housing and the backing plate. Steam pressure can be applied simultaneously to all of the brake linings according to the system of my invention for conditioning the brake linings. Similarly, a vacuum may be established and dirt, foreign matter and metallic particles withdrawn from the brake drums through the pipe distribution system and through terminus 49 simultaneously. Moreover, the system illustrated in Figs. 7, 8 and 9 allows the brake linings within the several brake drum housings to be subjected to a cooling treatment through the central distribution system, which is often desirable under conditions where the brake linings and the brake drums are subjected to excessive heating. Such heating is detrimental, not only to the condition of the brake linings, but also, due to the conduction of heat in metallic wheels, to the pneumatic tire.

Referring to Fig. 10, I have shown a brake drum 22 which has a relatively thin wall and which may not, therefore, readily support the screw-threaded stem device 19. Accordingly, I provide an additional block 65 which is apertured and screw-threaded at 66 in alignment with the aperture 20 in the wall of the brake drum 22. The aperture 66 in block 65 is screw-threaded to receive the screw-threaded end of stem device 19, to reinforce the screw-threaded connection between stem device 19 and brake drum 22. The block 65 is apertured at 67 for the passage of securing screws 68 which provide mounting means for the block 65. This arrangement enables my invention to be applied to existing cars, some of which have very thin brake drums. Of course, brake drums may be made thicker in brake systems produced in accordance with my invention, but there is an advantage in providing means for attaching the device of my invention to existing cars.

I have described my invention in certain preferred embodiments, but I realize that other modifications of my invention may be made, and it is my intention to include such modifications within my invention herein, and I intend no

What I claim as new and desire to secure by Letters Patent of the United States is as follows:

1. A brake system comprising a brake drum housing, including a brake drum engaging member having a brake lining thereon, a stem device carried by said brake drum housing and terminating in an opening adjacent the gap normally existing between the surface of the brake drum and the surface of the brake lining when the brake drum engaging member is in released position, said stem member being adapted to be oriented throughout the entire periphery of the brake lining, and means for establishing connection between a fluid pressure source and said stem member for delivering fluid pressure within said gap for treating the surface of the brake lining.

2. A brake system comprising in combination with a brake drum housing, including a brake drum and a brake drum engaging member having a brake lining thereon, a pressure applying device extending radially through said brake drum and terminating normal to a tangent drawn through the surface of the brake lining, and means for establishing connection between a pressure source and said pressure applying device for delivering a pressure medium directly against the surface of said brake lining, said pressure applying device being shiftable through 360° with the movement of said brake drum housing for treating the surface of the brake lining throughout the entire surface area.

3. In a brake system, a brake drum housing including a brake drum and a brake drum engaging member having a brake lining thereon, the wall of said brake drum housing being recessed in a position normal to the plane of the surface of the brake drum, with one side of the recess terminating between the surface of the brake drum and the exterior surface of the brake drum housing for providing abutment in the plane of the interior wall of one side of the brake drum housing, a tubular device screw-threaded into the recessed portion of the wall of the brake drum housing and limited by contact with the abutment in the plane of the interior wall of said brake drum housing, and means for delivering a fluid pressure medium through said tubular device for distribution between the surface of said brake drum and the surface of the brake lining.

4. In a brake system, a brake drum, including a brake drum housing, a backing plate coacting therewith, a brake drum engaging member, a brake lining carried by said brake drum engaging member, said brake drum engaging member being retractable to release the brake lining from engagement with the brake drum, with a gap separating the surface of the brake lining and the brake drum, a plurality of means extending through said backing plate for delivering a pressure medium at a plurality of different positions around said brake drum, and directly within the gap between the surface of the brake lining and the brake drum for cleaning said brake lining and said brake drum.

5. In a brake system, a brake drum, including a brake drum housing, a backing plate coacting therewith, a brake drum engaging member, a brake lining carried by said brake drum engaging member, said brake drum engaging member being retractable to release the brake lining from engagement with the brake drum, with a gap separating the surface of the brake lining and the brake drum, a plurality of tubular devices extending through said backing plate in separated positions aligned with the gap between the surface of the brake lining and the brake drum when the brake engaging member is in released position, and means for delivering a pressure medium through each of said tubular devices for directly treating substantially the entire surface of said brake lining.

6. In a brake system, a brake drum, including a brake drum housing, a backing plate coacting therewith, a brake drum engaging member, a brake lining carried by said brake drum engaging member, said brake drum engaging member being retractable to release the brake lining from engagement with the brake drum, with a gap separating the surface of the brake lining and the brake drum, tubular members extending through said backing plate in positions aligned with the gap normally existing between said brake lining and the brake drum when the brake engaging member is in released position, a pressure distribution member connected with each of said tubular members, a fluid pressure inlet connected with said distribution member, and means for establishing connection between a source of fluid pressure and said fluid pressure inlet for delivering fluid under pressure in the gap between the surface of said brake drum and the surface of said brake lining.

7. In a brake system for vehicles comprising in combination with a chassis structure, sets of wheels supporting the chassis structure, brake drums for controlling the operation of each of said wheels, said brake drums including brake actuating members and brake linings carried thereby, devices disposed adjacent each of said brake drums for delivering a fluid pressure medium to each of said brake drums substantially coextensive with the braking area thereof, a central pressure connection on said chassis, a distribution system extending from said central pressure connection, and flexible connections between said distribution system and each of the devices adjacent each of said brake drums for delivering fluid pressure to said brake drums for treatment of the brake linings in each of said brake drums.

8. A brake system for vehicles comprising in combination with a chassis and wheel structure, a brake drum housing individual to each wheel structure, including a brake drum, a brake actuating member having a brake lining coacting with the brake drum, a backing plate for each brake drum housing, a plurality of pressure directing members mounted in said backing plate in alignment with the brake lining within the brake drum housing, a manifold connecting said pressure directing members, a fluid pressure distribution system on said chassis, including a pipe line having a terminus adjacent the backing plate of each brake drum housing, and a flexible tubular connection between the terminus and the manifold of each brake drum housing for delivering fluid under pressure through said directing members and substantially coextensive with the brake lining within each brake drum housing.

9. A brake system for vehicles comprising in combination with a chassis and wheel structure, a brake drum housing individual to each wheel structure, including a brake drum, a brake actuating member having a brake lining coacting with the brake drum, a backing plate for each brake drum housing, a plurality of pressure directing members mounted in said backing plate in alignment with the brake lining within the brake drum housing, a pipe connecting all of the pressure directing members individual to each brake drum housing for providing a parallel path for fluid under pressure to the brake lining in each brake drum housing, a fluid pressure distribution system on said chassis, including a pipe line having a terminus adjacent the backing plate of each brake drum housing, and a flexible tubular connection between each terminus and the pipe connecting the pressure directing members on each brake drum housing for delivering fluid under pressure through said directing members and substantially coextensive with the brake lining within each brake drum housing.

10. A brake system for vehicles comprising in combination with a chassis and wheel structure, a brake drum housing individual to each wheel structure, including a brake drum, a brake actuating member having a brake lining coacting with the brake drum, a backing plate for each brake drum housing, a plurality of pressure directing members mounted in said backing plate in alignment with the brake lining within the brake drum housing, a pipe connecting said pressure directing members, said pipe being spaced from the wall of said backing plate, a fluid pressure coupling connection on said pipe, a fluid pressure distribution system on said chassis, including a pipe line having a terminus adjacent the backing plate of each brake drum housing, and a flexible tubular connection between said pressure coupling connection on the pipe line adjacent each backing plate for delivering fluid under pressure in contact with the brake lining within each brake drum housing.

11. In combination with a friction brake comprising a brake surface and a brake shoe having a brake lining thereon, means for cleaning the coacting areas of said brake surface and said brake lining of foreign matter; said means comprising a fluid conduit terminating at one end adjacent the said coacting areas, the other end of said conduit being connectible with a fluid pressure system, and a valve release pin mounted in the said other end of said conduit and adapted to coact with valve means in the fluid pressure system.

12. In combination with a friction brake comprising a brake surface and a brake shoe having a brake lining thereon, means for cleaning the coacting areas of said brake surface and said brake lining of foreign matter; said means comprising a fluid conduit terminating at one end adjacent the said coacting areas, the other end of said conduit being connectible with a fluid pressure system, a valve release pin mounted in the said other end of said conduit and adapted to coact with valve means in the fluid pressure system when such system is connected with said conduit, and a closure member for the said other end of said conduit for normally closing said conduit.

13. In a brake system of the type described, in combination with a brake drum housing and a normally closed fluid conduit mounted on said brake drum housing and rotatable therewith, a counterweight mounted on said housing diametrically with respect to said fluid conduit.

14. In combination with a friction brake comprising a brake surface and a brake shoe having a brake lining thereon, means for cleaning the coacting areas of said brake surface and said brake lining of foreign matter; said means comprising fluid conducting means operable substantially coextensive of the said coacting areas and connectible with a fluid pressure system for supplying a fluid under pressure to substantially the entire coacting areas for cleaning said areas.

JOSEPH K. LEVEEN.